United States Patent [19]

Pöllinger et al.

[11] 4,090,591

[45] May 23, 1978

[54] BRAKE SHOE FOR DISC BRAKES

[75] Inventors: Hans Pöllinger; Franz Prahl, both of Munich, Germany

[73] Assignee: Knorr-Bremse GmbH, Munich, Germany

[21] Appl. No.: 734,766

[22] Filed: Oct. 22, 1976

[30] Foreign Application Priority Data

Oct. 23, 1975  Germany .............................. 2547529

[51] Int. Cl.² ........................................... F16D 69/04
[52] U.S. Cl. .................................... 188/73.1; 188/244; 188/250 G
[58] Field of Search ....................... 188/73.1, 73.6, 234, 188/242, 244, 245, 246, 250 R, 250.8, 250 G, 73.3

[56] References Cited

U.S. PATENT DOCUMENTS

| 18,435 | 10/1857 | Collier | 188/234 |
|---|---|---|---|
| 2,684,133 | 7/1954 | Chester | 188/246 |
| 3,171,516 | 3/1965 | Parton | 188/250 G |
| 3,851,738 | 12/1974 | Gebhardt et al. | 188/250 G |
| 3,954,158 | 5/1976 | Rist | 188/73.3 |

FOREIGN PATENT DOCUMENTS

| 2,154,041 | 5/1973 | Germany | 188/245 |
|---|---|---|---|
| 485,144 | 10/1929 | Germany | 188/234 |
| 2,434,004 | 2/1976 | Germany | 188/234 |
| 2,132,407 | 1/1973 | Germany | 188/242 |
| 10,571 | 5/1969 | Japan | 188/250 B |
| 616,124 | 1/1949 | United Kingdom | 188/246 |

Primary Examiner—Trygve M. Blix
Assistant Examiner—Edward R. Kazenske
Attorney, Agent, or Firm—Edmund M. Jaskiewicz

[57] ABSTRACT

A brake shoe has a groove in a support member to receive a dove-tail guide on a brake lining to hold the brake lining on the support member. One longitudinal side of the groove is inclined to define a wedge and the other longitudinal side is straight. Springs are mounted on the support member on the straight side of the groove to extend behind and clamp the brake lining dove-tail guide. Modifications of the groove include inclined sides along only portions of the groove and springs at the straight wall portions of the groove to extend behind and clamp the dove-tail guide of the brake lining.

8 Claims, 9 Drawing Figures

BRAKE SHOE FOR DISC BRAKES

The present invention relates to brake shoes for vehicle disc brakes, more particularly, to the retaining of a brake lining on the lining support member of the brake shoe.

Brake shoes for disc brakes, particularly for the disc brakes of railway vehicles, comprise a support member having a lining guide thereon into which is inserted a brake lining. An additional device is provided to retain the brake lining on the support member. One such form of a brake shoe has a dove-tail guide groove having a closed end and the brake lining is slid into the groove through one end thereof. A pivotable locking bolt is then provided at the end of the groove to secure the brake lining therein. While such structures are generally satisfactory with respect to precise and accurate positioning of the brake lining on the brake shoe they are disadvantageous in that the locking bolt must have a heavy and sturdy construction in order to meet the high operating requirements of disc brakes.

For disc brakes particularly intended for motor vehicles the brake lining has been set into an opening located in the support member so that it is not necessary to slide in or insert the brake lining. In the case of disc brakes used on railway vehicles brake shoes have been proposed wherein the brake lining is positioned in an opening formed in the brake lining support member. The brake lining is retained in position by permanent magnets located on the mutually opposed surfaces of the brake lining and support member. The brake lining may be provided with a ferromagnetic portion or a plurality of ferromagnetic projections on its rear side to be received in corresponding recesses formed in the support member. The recesses are provided with magnets at the bottoms thereof.

However, such magnetic structures give rise to certain problems. Since the brake lining is generally positioned along the edge of the support member which defines the lining guide, an air gap is formed between the magnetic elements on the brake lining or on the base of the brake lining support. The air gap not only considerably reduces the magnetic attraction between the elements but permits the penetration of dirt into the gap which again reduces the magnetic retaining effect.

The normal operation of railway vehicles produces continuous vibrations on the brake shoes which are detrimental to the magnetic force in that the magnetic force is strongly decreased. In order to facilitate the replacement of the magnet after a period of about 3-4 years, the magnets must preferably be embedded in the back surfaces of the brake linings. However, if the magnet is located in the brake lining support member additional milling work may be required in order to form one or two recesses. Even aside from such increased costs incurred during replacement of the magnets, the use of magnets is generally considered to be a relatively expensive structure for retaining brake linings.

It is therefore the principal object of the present invention to provide a brake shoe for vehicle disc brakes which has novel and improved structure for retaining a brake lining on the support member of the brake shoe.

It is another object of the present invention to provide such a brake shoe wherein the brake lining can be easily and quickly inserted into the lining guide of the support member and retained therein by a simple and inexpensive structure.

It is a further object of the present invention to provide such a brake shoe which facilitates the mounting and removal of brake linings therefrom.

According to one aspect of the present invention a brake shoe for vehicle disc brakes may comprise a brake lining support member having lining guide means thereon to receive a brake lining having a dove-tail guide. The lining guide means comprises a groove having one longitudinal side which is inclined to form a wedge profile and the other longitudinal side is straight. Spring means are mounted on the support member along the straight side of the lining groove to engage behind one edge of the dove-tail guide on a brake lining when the lining is positioned on the lining guide means to clamp the dove-tail guide in the groove.

The spring means may comprise a plurality of coiled torsion springs each of which has a radial portion extending into the groove when in its released state. The springs may also be U-shaped and one arm of each spring extends through an opening in the support member into the path of a brake lining to be positioned in the lining guide means.

The lining guide groove may also be formed with portions of both walls of the groove being inclined to form a dove-tail section and the remaining portions of the walls being straight.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
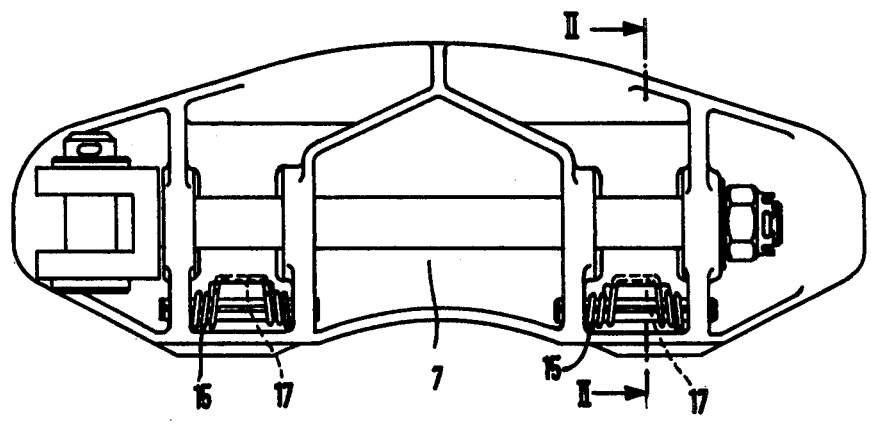
FIG. 1 is a plan view of a brake lining support member of a brake shoe according to the present invention which receives a two-piece brake shoe.
Figure 3:
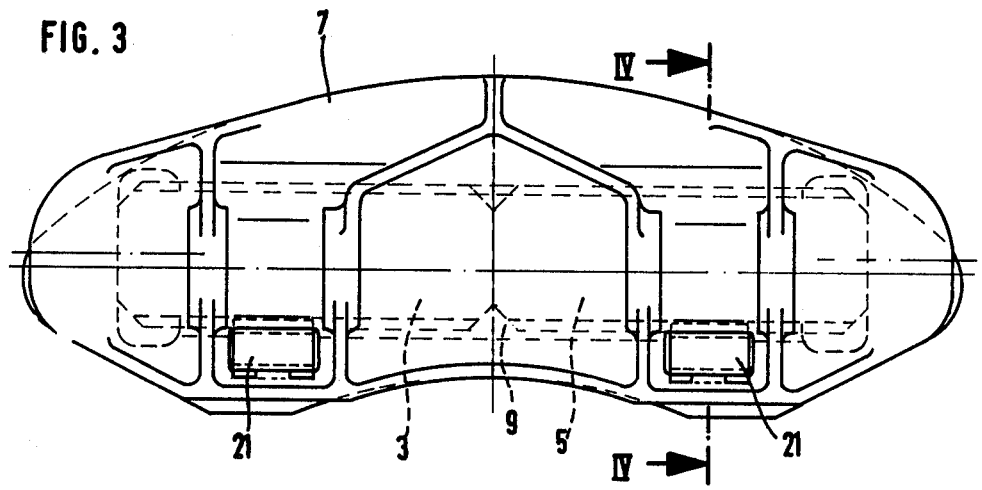
FIG. 3 is a view similar to that of FIG. 1 but showing a modification of the brake lining support member.

In FIG. 1 there is illustrated a brake shoe upon which is mounted a two-piece brake lining 1 consisting of brake lining halves 3 and 5 as indicated in FIG. 3. The brake shoe comprises a brake lining support member 7 which receives the brake lining halves 3 and 5 and can be constructive symmetrically in view of the structure for retaining the brake lining which will be subsequently described. The half of the brake lining support on the left side of the transverse division line shown in FIG. 3 corresponds to the mirror image of the right hand half of the support member. Accordingly, the brake lining support can be employed for both right and left hand embodiments.

Figure 2:
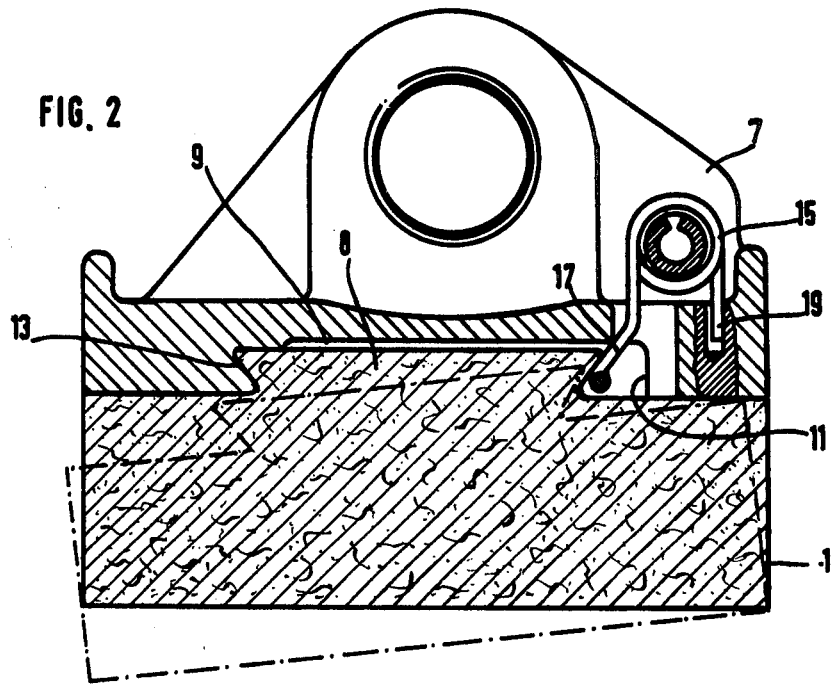
FIG. 2 is a sectional view along the line II—II of FIG. 1 in enlarged scale.

The brake lining 1 and the brake lining halves 3 and 5 have the standard or conventional structure comprising a dove-tail guide 8 as shown in FIG. 2. The support member 7 is provided with a lining guide 9 which in accordance with the present invention comprises a unilateral dove-tail guide wherein one longitudinal side of the lining guide groove 9 is inclined so as to form a wedge profile 13 while the opposed longitudinal side is not inclined or straight as shown at 11. As can be seen in FIG. 2, one edge of the dove-tail guide 8 can be locked beneath the longitudinal side 13 and the other side of the dove-tail guide is spaced at a certain distance from the straight side 11. Accordingly, the groove 9 has a greater width than the dove-tail guide 8 of the brake lining.

A pair of torsion springs 15 are mounted on pins on the lining support positioned along the longitudinal side 11 of the groove 9. A spring 15 is provided for each brake lining half and each spring has a radially extending portion 17 which extends into the groove 9 into the path of the dove-tail guide 8 as shown in FIG. 2. Each spring 15 also has extensions 19 which are secured in suitable recesses formed in the brake lining support member as also seen in FIG. 2.

The extension 17 extends into the space to be occupied by the brake lining guide when the brake lining is inserted. The extension 17 is thus in its extended or released condition. In order to insert the brake lining, the spring extension 17 must be tensioned by being rotated counter clockwise as shown in FIG. 2. The insertion of the brake lining or of the individual brake lining halves 3 and 5 into the groove 9 occurs as indicated by the dot-dash lines in FIG. 2. The brake lining is manually positioned such that an edge of the guide 8 engages the spring extension 17 in the manner as shown by the dot-dash lines. The lining is then pressed obliquely downwardly as shown in FIG. 2 until its guide 8 can be locked under the inclined longitudinal side 13 of the groove.

After the brake lining has been shifted against the force of spring 15, the radial extension 17 of the spring will then press the inserted brake lining under a certain retaining force against the uni-lateral dove-tail guide surface 13. Such a clamping or retaining force is sufficient for preventing the brake lining from dropping out. Since the brake lining is never subjected to lifting forces occurring perpendicularly to its surface, the springs 15 need not have large spring forces. Accordingly, the springs 15 can be readily tensioned manually during the insertion of the brake lining as described above. The spring 15 of FIG. 2 has such a configuration, particularly of its extension 17, so as to extend behind the dove-tail guide 8 of the brake lining and clamp the lining within the groove 9.

Figure 4:
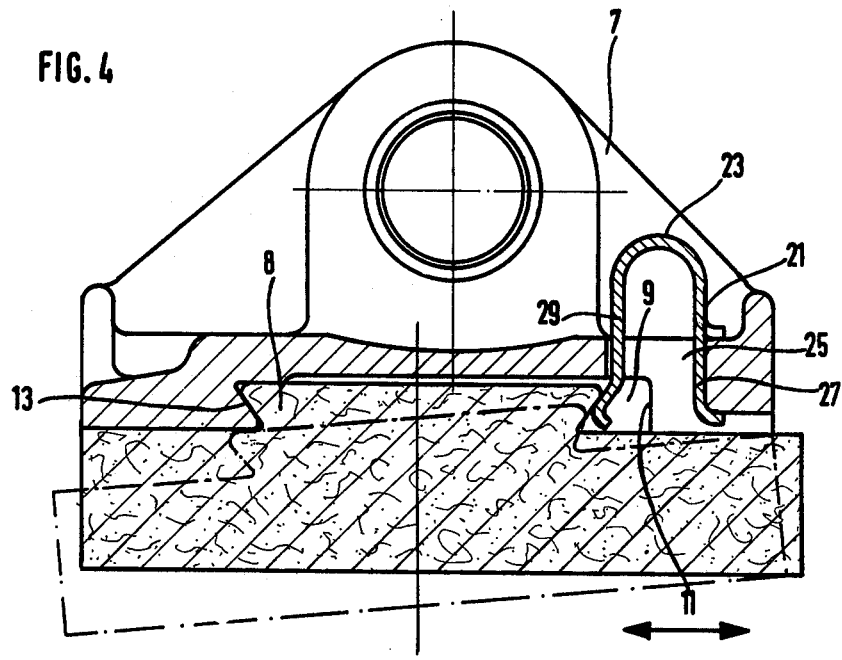
FIG. 4 is a sectional view along the line IV—IV of FIG. 3 in enlarged scale.
Figure 5:
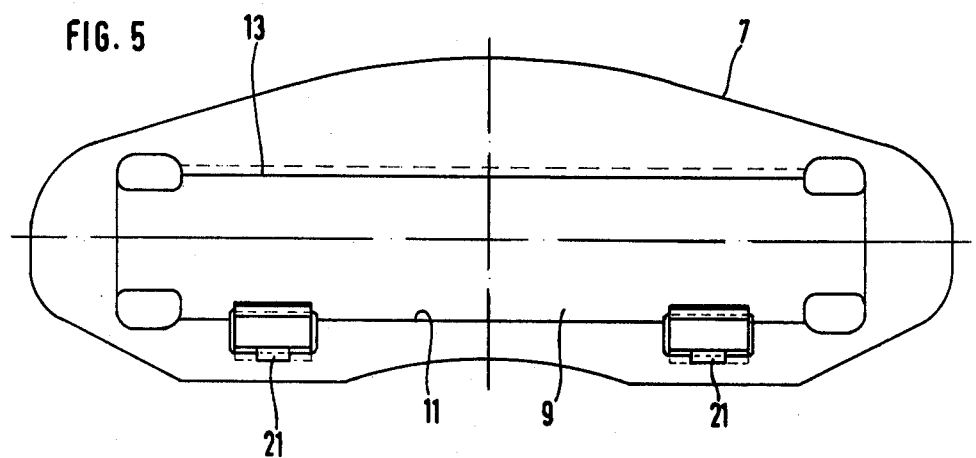
FIG. 5 is a bottom plan view of the brake lining support member of FIGS. 1 and 2.

In FIGS. 3—5, a spring 21 which is shown in FIG. 4 is employed which has essentially a U-shaped section so as to form arms 27 and 29. These arms extend through an opening 25 formed in the upper side of the brake lining support member such that the inner ends of the arms 27 and 29 are directed toward the brake lining. Arm 27 as may be seen in FIG. 4 is suitably anchored or secured in the support member such as by extending below a shoulder formed in the member. Arm 29 projects into the lining guide groove 9 as explained above with respect to FIGS. 1 and 2 and has a suitable configuration so as to extend behind and clamp the dove-tail guide 8 of the brake lining.

As described above, the brake lining comprises lining halves 3 and 5 and the two springs 21 are positioned along the straight wall longitudinal side 11 of the groove 9. As can be seen in FIG. 5, the brake lining guide groove is closed at both ends so that a pivotable locking bolt is not required to bear against the ends of the inserted brake lining.

A two-piece brake lining is preferable when the brake shoe surface has an area of about 350 cm$^2$ so as to improve the braking force. The structure according to the present invention for retaining the brake lining in the support member is particularly suitable for such divided brake linings and can also be employed when the brake lining is divided in three or more units. In such cases a corresponding number of springs is employed. In accordance with the present invention one can also utilize a single spring for each brake lining support member in those instances where a one-piece brake lining is used. A one-piece lining is particularly suitable for brake linings having a braking surface less than 350 cm$^2$.

Figure 6:
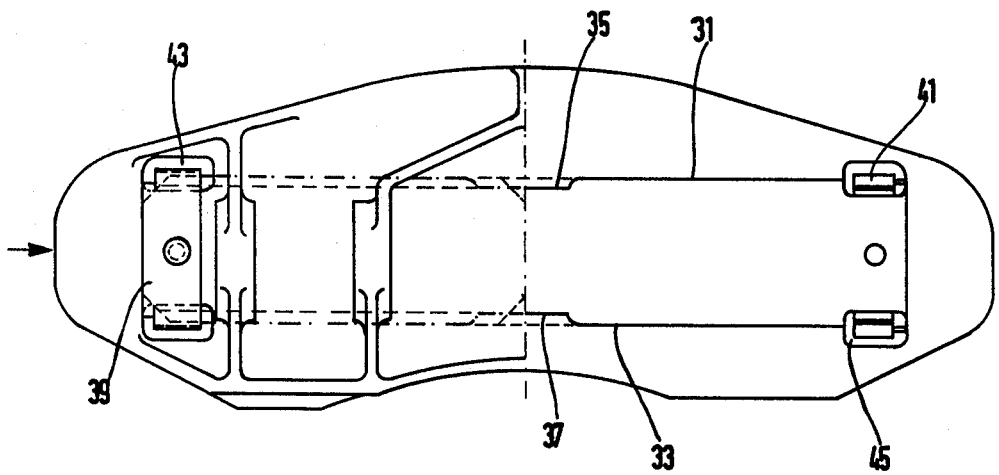
FIG. 6 is a plan view of a further modification of a brake lining support member with the left half of the view being a top plan view and the right half of the view being a bottom plan view.
Figure 7:
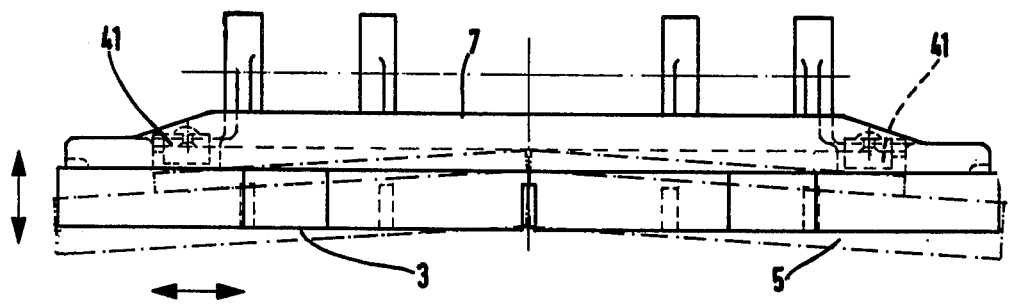
FIG. 7 is an elevational view of the brake lining support member of FIG. 6 showing in dot-dash lines the movement of brake lining halves during the insertion thereof into the support member.
Figure 8:
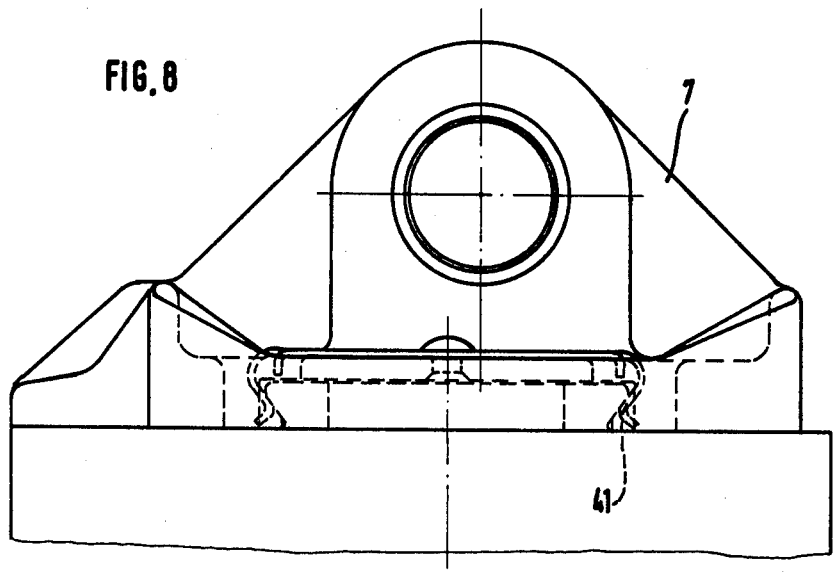
FIG. 8 is a front elevational view in enlarged scale of the support member of FIG. 6 viewed in the direction of the arrow.

Under certain conditions which may be encountered during assembly of the brake shoe it may be desirable that the brake lining consists of two brake lining halves which are introduced in the longitudinal direction of the brake lining support member from the longitudinal or head ends of the support member. The support members illustrated in FIGS. 6–8 are particularly suited for such assembly of the brake linings. As will be apparent from the two elevational views of FIG. 6 the lining guide groove 9 is provided with two longitudinal sides 31 and 32 which are straight except for short central portions 35 and 37 which have inclined sides to form a dove-tail section. Springs 39 and 41 are mounted at the head ends of the longitudinal sides of the groove and the springs extend through openings 43, 45 into the lining guide groove in the manner as shown in FIG. 8. The springs 39 and 41 each comprises a pair of outwardly bent short spring arms that are connected to each other by a cross piece attached to the upper side of the support member by screws. It is to be noted that other forms of springs may be employed such as the spring shown in FIG. 3.

Insertion of the brake lining halves 3 and 5 is shown in FIG. 7. Each half is initially inserted with its dove-tail guide into a short dove-tail section 35, 37 so that the lining halves are in the positions as indicated by the dot-dash lines. The outer ends of the lining halves are then pressed inwardly against the support member so as to be snapped between the arms of the springs 39 and 41. The arms are shaped so as to extend behind and clamp the dove-tail guides of the lining halves. The play between the dove-tail sections 35 and 37 of the groove and the brake linings to be introduced is sufficient to enable the above described pivoting movements of the lining halves to be executed.

Figure 9:
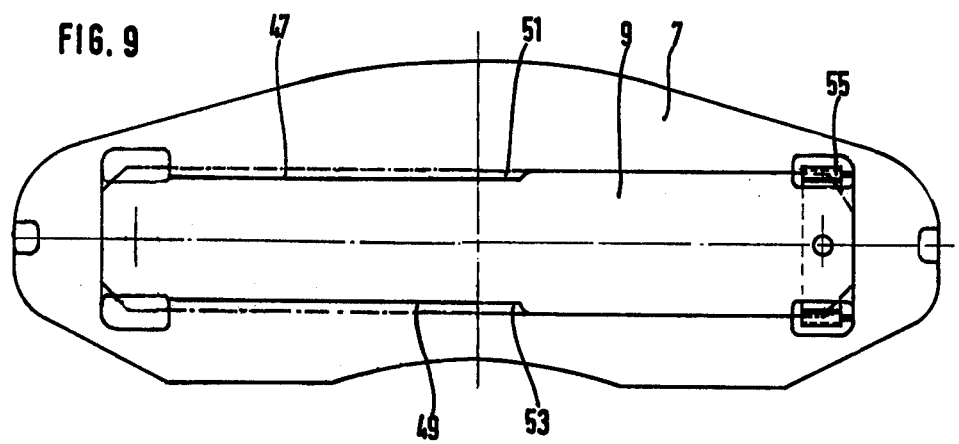
FIG. 9 is a bottom plan view of still a further modification of a brake lining support member according to the present invention.

In the support member of FIG. 9, the lining groove 9 is closed at both ends and the longitudinal sides 47 and 49 of the groove are inclined to form a dove-tail section which extends throughout the left half of the groove and through an adjoining short portion of the groove 51 and 53 as shown in FIG. 9. The portion of the brake lining support on the right side of the transverse centerline of FIG. 9 is thus constructed in the same manner as that of FIG. 6 in that at the head end of the lining guide groove there is located a spring 55 which is similar to above described springs 39 and 41. The half of the groove on the left side of the center dividing line of FIG. 9 is not provided with a spring.

The brake lining halves are inserted by introducing the first brake lining half from the right side of FIG. 9 into the continuous dove-tail slot. This first lining half is then pushed until the half contacts the left hand end of the lining guide groove and is in the position as shown in FIG. 9. A spring is not required to retain this left half of the lining in position since the entire length of the dove-tail guide is received in a dove-tail groove of the support member. The second lining half is then inserted in the same manner as described above for the modification of FIGS. 6 and 7. The short dove-tail section 51 and 53 are provided with sufficient play or clearance to allow the angular pivoting of the brake lining halves which is required for assembly of the halves in this manner. The support member structure of FIG. 9 is particularly suitable in those installations wherein space is at a minimum and the brake lining halves can only be introduced from one end of the support member.

Thus it can be seen that the present invention discloses a brake lining support member wherein the lining guide is constructed only partially as a dove-tail section. This partial dove-tail guide construction makes possible the insertion or sliding in of the brake lining as described above. The present invention has the particular advantage in that the conventional locking bolts or locking mechanisms can be omitted. These pivotal locking bolts are relatively expensive both with respect to material and with respect to manufacturing costs. The support members are also suitable for both left and right hand embodiments. In addition, the springs employed exert sufficient force to provide lateral clamping to retain the brake lining halves securely and free from movement or vibration when not subjected to any braking action. Accordingly, no unpleasant noises will be produced by the brake linings when they are not subjected to braking.

The coil torsion springs or U-shaped springs which are employed are mounted on a support member such that an extension or arm projects into the lining guide groove in the path of the brake lining half which is to be inserted. When a U-shaped spring is employed, the laterally outer arm rests on a wall of the opening in the brake lining support and the inner arm projects into the lining guide groove.

It will be understood that this invention is susceptible to modification in order to adapt it to different usages and conditions, and accordingly, it is desired to comprehend such modifications within this invention as may fall within the scope of appended claims.

What is claimed is:

1. A brake shoe for vehicle disc brakes comprising a brake lining support member having inner and outer surfaces, a lining guide means comprising a groove having a bottom wall and first and second longitudinal side walls in the inner surface of said support member, said first side wall being inclined relative to said bottom wall to form a wedge profile therewith and said second side wall being substantially perpendicular to said bottom wall of said groove, a brake lining having a longitudinal dove-tail guide thereon, said dove-tail guide being received in said groove and having first and second edges, and at least one spring means mounted on said outer surface of said support member and having a first portion thereof extending through an opening in said support member into said groove at said perpendicular side wall of the groove to engage behind one of said edges of the dove-tail guide on the brake lining when the lining is positioned on said lining guide and the other of said edges of the dove-tail guide being engaged with the inclined side wall of the groove such that the dove-tail guide is clamped in said groove between said inclined side wall and the extending portion of said spring means.

2. A brake shoe as claimed in claim 1 and further comprising a plurality of pins on the outer surface of said support member parallel to said perpendicular side wall of the groove, said spring means comprising a plurality of coiled torsion springs each mounted on one of said pins.

3. A brake shoe as claimed in claim 1 wherein said support member has a plurality of said openings in the vicinity of said perpendicular side wall of the groove, said spring means comprising a plurality of U-shaped springs each having a second extending portion and both said portions projecting into one of said openings, said first portion of each spring extending into said groove and engageable with said one of said edges of the dove-tail guide on the brake lining.

4. A brake shoe as claimed in claim 1 wherein said lining guide means has closed ends.

5. A brake shoe for vehicle disc brakes comprising a brake lining support member having inner and outer surfaces, a lining guide means comprising a groove having a bottom wall and first and second longitudinal side walls and closed outer ends in the inner surface of said support member, said first and second side walls being inclined relative to said bottom wall only along short central portions thereof to form a dove-tail section and the remaining portions of said first and second side walls extending to said closed ends being substantially perpendicular to said bottom wall of the groove, a brake lining being divided transversely into halves and each half having a dove-tail guide thereon, and springs mounted on the outer surface of said support member at the ends of the perpendicular portions of said side walls away from said central portions of said side walls, each having a pair of arms extending through openings in said support member to engage behind the dove-tail guides of the brake lining halves when an end of each half is inserted into the dove-tail section of the groove and the other end of each half is seated within the perpendicular side walls of the groove so that the dove-tail guides of the lining halves are clamped in the groove, there being a dove-tail connection between the brake lining and the groove only at the short central portions of said first and second side walls.

6. A brake shoe as claimed in claim 5 wherein each pair of arms on each spring is at the ends of a cross piece attached to said support member.

7. A brake shoe for vehicle disc brakes comprising a brake lining support member having outer and inner surfaces, a lining guide means comprising a groove having a bottom wall, first and second longitudinal side walls and closed outer ends in the inner surface of said support member, said first and second side walls each having a portion inclined relative to the bottom wall from one of said closed ends to a point intermediate said closed ends to define a dove-tail section and the remaining portion of each of said first and second side walls extending to the other of said closed ends and being substantially perpendicular to said bottom wall of the groove, a brake lining having a longidtudinal dove-tail guide thereon, said brake lining being inserted in a longitudinal direction into said groove and a spring element mounted on said outer surface adjacent said other of said closed ends of the groove, said spring element having portions extending through openings in said support member to engage behind the dove-tail guide of the brake lining inserted into the groove, there being a dove-tail connection between the brake lining and the groove only at that portion of the groove defined by said inclined side walls.

8. A brake shoe as claimed in claim 7 wherein said groove is divided into two halves by a transverse centerline therethrough, said groove dove-tail section extends throughout one of said groove halves and along a short adjoining portion of the other of said groove halves.

* * * * *